(12) United States Patent
Corleto et al.

(10) Patent No.: US 7,754,849 B2
(45) Date of Patent: *Jul. 13, 2010

(54) DEVOLATILIZER NOZZLE

(75) Inventors: Carlos R. Corleto, Seabrook, TX (US); John Tomlinson, Prairieville, LA (US)

(73) Assignee: Fina Technology, Inc., Houston, TX (US)

( * ) Notice: Subject to any disclaimer, the term of this patent is extended or adjusted under 35 U.S.C. 154(b) by 626 days.

This patent is subject to a terminal disclaimer.

(21) Appl. No.: 11/345,439

(22) Filed: Feb. 1, 2006

(65) Prior Publication Data

US 2007/0120285 A1    May 31, 2007

Related U.S. Application Data

(60) Provisional application No. 60/740,407, filed on Nov. 28, 2005.

(51) Int. Cl.
*C08F 6/00* (2006.01)
*C08G 4/00* (2006.01)

(52) U.S. Cl. .................... 528/480; 159/2.1; 159/2.3; 159/47.1; 264/40.3; 264/557; 528/241

(58) Field of Classification Search .................. 159/2.1, 159/2.3, 47.1; 264/40.3, 557; 528/241, 480
See application file for complete search history.

(56) References Cited

U.S. PATENT DOCUMENTS

| | | | |
|---|---|---|---|
| 4,294,652 A | | 10/1981 | Newman |
| 4,816,524 A | * | 3/1989 | Anzai et al. .................. 525/378 |
| 4,934,433 A | | 6/1990 | Aboul-Nasr |
| 5,118,388 A | | 6/1992 | Aboul-Nasr |
| 5,184,585 A | * | 2/1993 | Wilson ..................... 123/179.8 |
| 5,540,813 A | * | 7/1996 | Sosa et al. ................. 159/47.1 |
| 5,551,354 A | * | 9/1996 | Crofut et al. ................ 110/238 |
| 5,874,525 A | | 2/1999 | Krupinski et al. |
| 6,124,426 A | * | 9/2000 | Sugimoto et al. ........... 528/480 |
| 2005/0097748 A1 | | 5/2005 | Corleto et al. |

FOREIGN PATENT DOCUMENTS

JP    64-47878    *   2/1989

* cited by examiner

Primary Examiner—Terressa M Boykin
(74) Attorney, Agent, or Firm—Tenley R. Krueger

(57) ABSTRACT

A devolatilizer nozzle comprising at least one perforated flow tube having a non-circular cross-section. In an embodiment, the non-circular cross-section has equal to or greater than 3 sides. The non-circular cross-section of said nozzle may be a triangle, diamond, pentagon, hexagon, heptagon, or octagon. A majority of the perforations in the flow tube of said nozzle may have a maximum strand angle of equal to or less than 45 degrees. The nozzle may further comprise tapered holes, which may be formed by a water jet. The nozzle may further comprise a plurality of parallel flow tubes. The nozzle may comprise 304 stainless steel, AL-6XN stainless steel, or LDX 2101 stainless steel.

10 Claims, 15 Drawing Sheets

*FIG. 16*
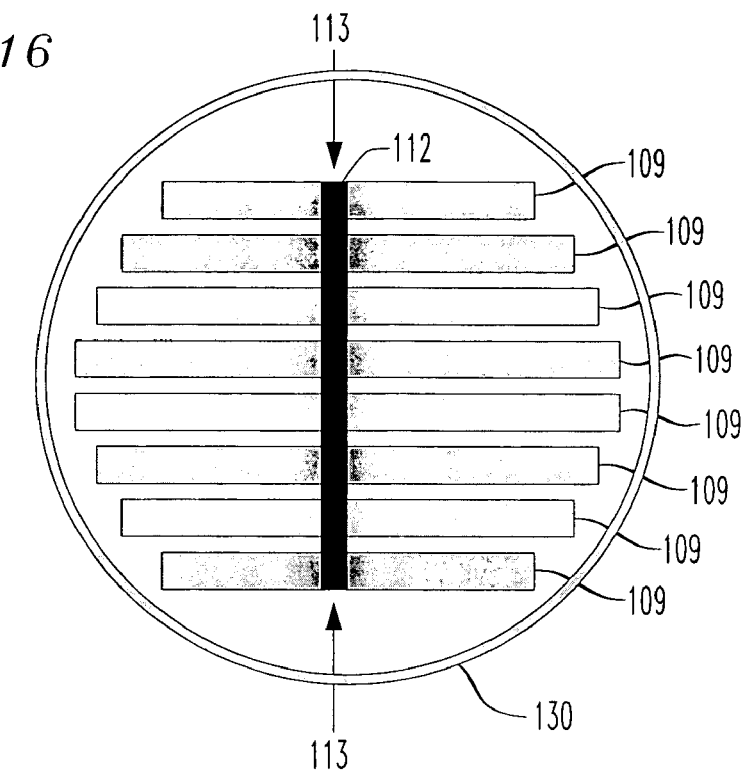
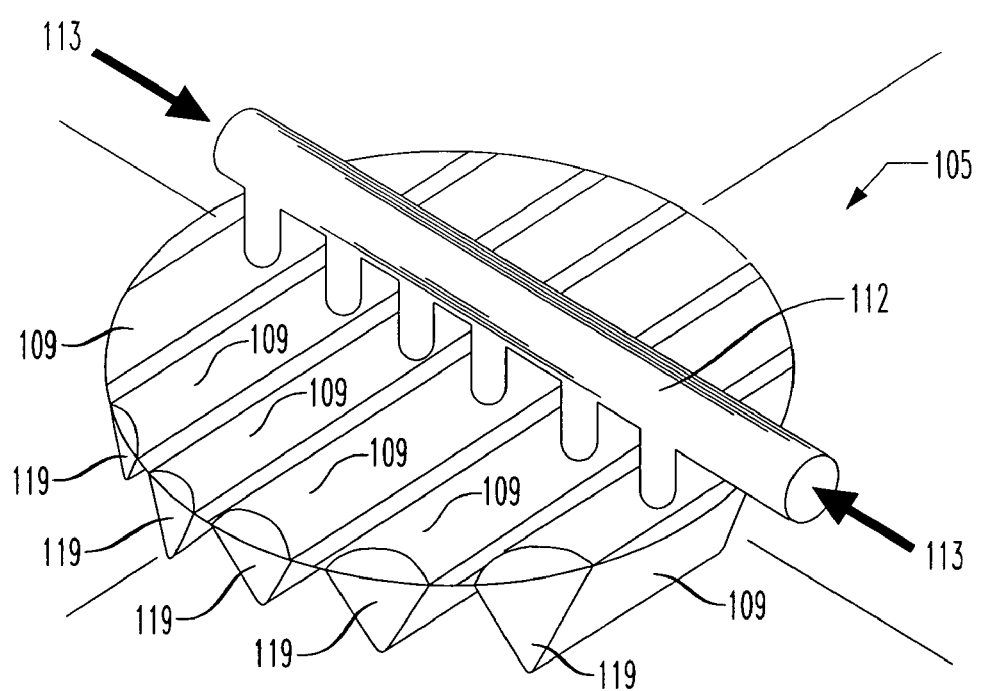
*FIG. 17*

US 7,754,849 B2

DEVOLATILIZER NOZZLE

CROSS-REFERENCE TO RELATED APPLICATIONS

The present application claims priority to U.S. Provisional Application No. 60/740,407 filed Nov. 28, 2005 and entitled "Devolatilizer Nozzle" which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates generally to devolatilizer nozzles, and, more particularly, to devolatilizer nozzles and methods of forming devolatilizer nozzles capable of improving devolatilization of polymers or other compounds while also maintaining or increasing production capacities thereof.

BACKGROUND OF THE INVENTION

Polymer may be recovered from a polymerization reactor and fed to a devolatilizer where undesirable components such as unreacted monomer or solvent may be removed from the polymer. For example, volatiles may be removed by vacuum distillation, flash devolatization, stripping, increasing polymer surface area, or combinations thereof. The surface area of a polymer may be increased by passing the polymer through a devolatilizer nozzle, which is an arrangement of one or more flow tubes having a plurality of small perforations or holes directed downward in a vessel for discharging molten polymer downward from the holes in relatively small diameter continuous vertical strands resembling spaghetti strands. The polymer strands provide increased surface area for devolatilization of the polymer. Examples of devolatilizer nozzles may be found in U.S. Pat. Nos. 5,540,813, 4,294,652, 4,934,433, 5,118,388, and 5,874,525, and U.S. Published Application 2005/0097748, which are incorporated herein by reference. Given the commercial importance of devolatilization, an ongoing need exists for improved devolatilization processes and associated equipment such as nozzles.

SUMMARY OF THE INVENTION

Disclosed herein is a devolatilizer nozzle comprising at least one perforated flow tube having a non-circular cross-section. In an embodiment, the non-circular cross-section has equal to or greater than 3 sides. The non-circular cross-section of said nozzle may be a triangle, diamond, pentagon, hexagon, heptagon, or octagon. A majority of the perforations in the flow tube of said nozzle may have a maximum strand angle of equal to or less than 45 degrees. The nozzle may further comprise tapered holes, which may be formed by a water jet. The nozzle may further comprise a plurality of parallel flow tubes. The nozzle may comprise 304 stainless steel, AL-6XN stainless steel, or LDX 2101 stainless steel.

Also disclosed herein is a devolatilizer nozzle comprising at least one flow tube further comprising one or more tapered holes. In an embodiment, all or a portion of the tapered holes have a linear taper or a funnel taper. The tapered holes of said devolatilizer nozzle may be formed by a water jet or laser drill. The tapered holes may reduce the pressure drop across the nozzle equal to or greater than about 50 percent as compared to non-tapered holes.

Also disclosed herein is a devolatilizer nozzle comprising at least one perforated flow tube wherein a majority of the perforations in the flow tube have a maximum strand angle of equal to or less than 45 degrees.

Also disclosed herein is a devolatilizer nozzle comprising a plurality of parallel, individual flow tubes in fluid communication with a molten polymer distribution manifold.

Also disclosed herein is a method of devolatilizing a polymer, comprising passing a molten polymer through a devolatilizer nozzle comprising at least one perforated flow tube to produce a plurality of polymer strands, wherein a majority of the strands exit the devolatilizer nozzle at a maximum strand angle of equal to or less than 45 degrees. The perforated devolatilizer nozzle may further comprise tapered holes, which may further comprise a non-circular cross-section. In an embodiment, the devolatilized polymer is polystyrene comprising equal to or less than about 1000 ppm of styrene monomer.

BRIEF DESCRIPTION OF THE DRAWINGS

FIG. 16 is an overhead view of a devolatilizer nozzle disposed within a vessel.

FIG. 17 is a schematic of a devolatilizer nozzle.

DETAILED DESCRIPTION OF THE INVENTION

Figure 1:
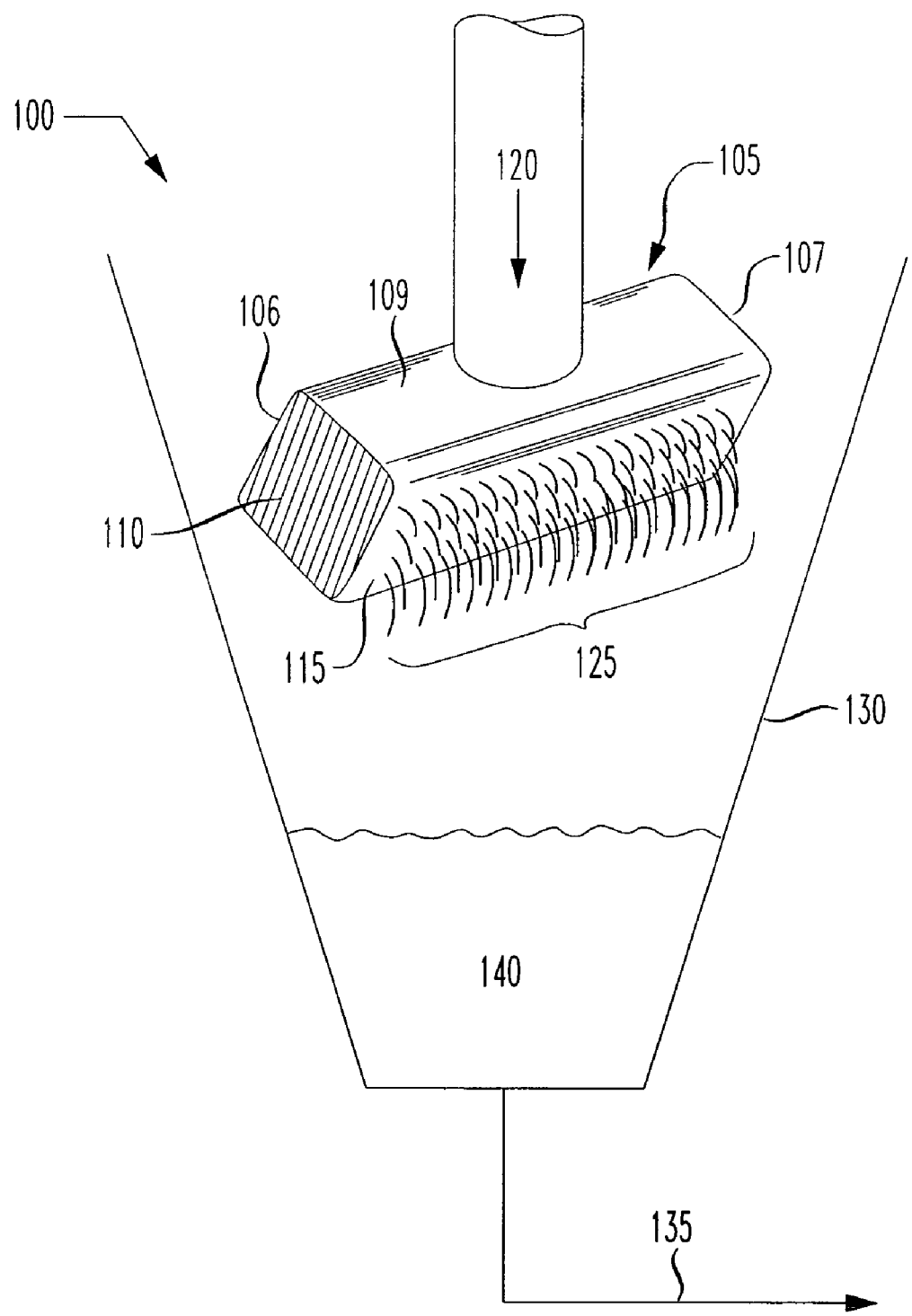
FIG. 1 is a schematic of a devolatilizer system.

FIG. 1 illustrates an embodiment of a devolatilizer system 100 for devolatilizing polymer. The devolatilizer system 100 comprises a devolatilizer nozzle 105 (or "nozzle") disposed with a vessel 130. For simplicity, the nozzle 105 is shown as a single flow tube 109 having closed ends 106 and 107, a cross-section 110, and a molten polymer feed line 120. However as shown in FIGS. 16 and 17, the nozzle 105 may comprise a plurality of individual flow tubes 109 arranged in any suitable pattern or configuration and connected via a molten polymer distribution manifold 112 such that molten polymer may flow as indicated by flow arrows 113 through all the flow tubes. In an embodiment, the manifold 112 is connected to the top and/or at or near one end of each of the individual flow tubes 109, but is not connected at each end of the flow tubes 109. The individual flow tubes may be structurally connected to each other to form an integrated nozzle assembly where the flow tubes are in fluid communication with the manifold 112. Depending on tube size and length, it might also be beneficial to have connections between individual flow tubes to insure even pressures and thus even flow rates through the perforations or holes 115 from which molten polymer exits and forms strands 125.

As shown in FIGS. 16 and 17, the individual flow tubes may be arranged in a parallel configuration within reactor vessel 130, and the flow tubes may have access ports 119 in the ends 106 and/or 107 thereof for maintaining or cleaning the nozzle. In an alternative embodiment, the nozzle (or components thereof such as the flow tubes) is assembled in two or more sections or halves and connected for example via flanges such that the nozzle is serviceable. In an embodiment, the nozzle comprises from 1 to 70, 1 to 60, 1 to 50, 1 to 40, 1 to 30, 1 to 20, 1 to 10, or 6 to 8 parallel flow tubes. The actual number of flow tubes may be a function of vessel size, production rate, devolatization requirements, material strength, and the pressure rating required.

In an embodiment, molten polymer is fed to the devolatilizer system 100 from one or more upstream devolatilization systems, for example from a flash devolatilizer. The molten polymer flows into and through the nozzle 105, which further comprises a plurality of perforations or holes 115 from which molten polymer exits and forms strands 125 that collect and re-pool in the bottom 140 of vessel 130. Volatiles exit the polymer strands, and the devolatilization efficiency refers to the weight percentage of volatiles removed from the polymer during devolatilization. Devolatilized polymer exits the vessel 130 via outlet 135, which transmits the devolatilized polymer to a finishing operation such as a pelletizer. In an embodiment, the devolatilizer system 100 is used to remove volatiles such as styrene monomer from polystyrene, with the further understanding that the devolatilizer system 100 may be employed in any suitable polymerization process. In an embodiment, the devolatilized polymer is polystyrene comprising equal to or less than about 1000, 900, 800, 700, 600, 500, 400, 300, 200, 100, or 50 ppm of styrene monomer.

Figure 2:
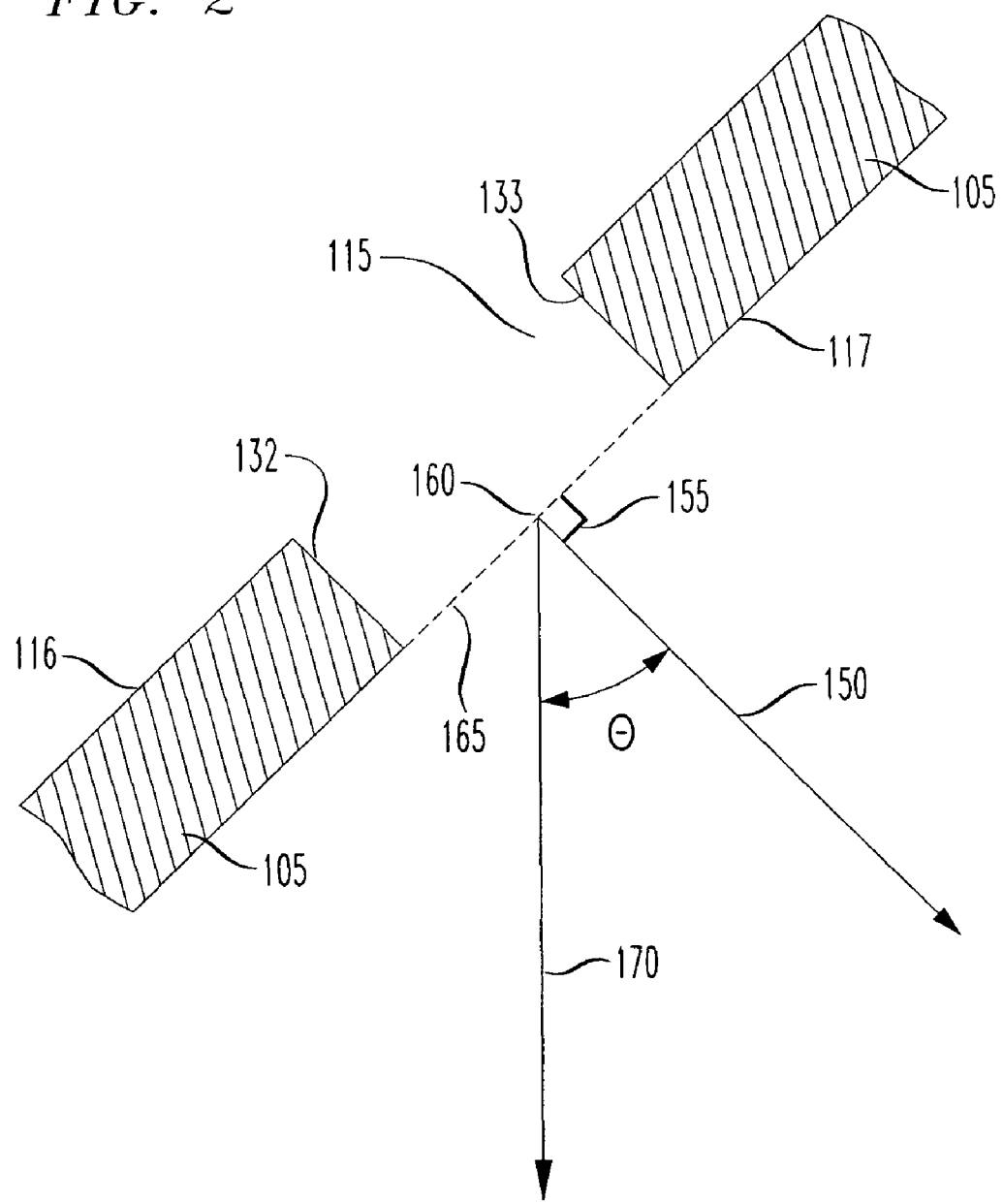
FIG. 2 is a magnified cross-sectional view of a nozzle hole showing a strand angle.

The strand angle may have an effect on devolatilization of the polymer. As used herein, strand angle refers to an angle at which a polymer strand flows from the inside 116 to the outside 117 and exits a nozzle hole 115 relative to a vertical axis, as shown in FIG. 2. More specifically, strand angle refers to an angle θ between (i) a strand line 150 extending outward 90 degrees (as shown by reference numeral 155) from a center point 160 of a plane 165 of the nozzle hole 115 and (ii) a plumb line 170 extending from the center point 160 of the plane 165 of the nozzle hole 115. In general the plumb line 170 is about parallel to the direction of fall for a polymer strand exiting the nozzle hole. Devolatilization efficiency depends on strand spacing in the vertical axis, as shown in FIG. 2. As used in here, strand spacing refers to center to center spacing of the strands along the lines parallel to 170. The optimum strand angle is affected by the strand spacing and nozzle hole 115 exiting diameter. In general, larger strand angles require either one or both of larger strand spacing or smaller hole diameter to maintain devolatilization efficiency. In an embodiment hole size, and for an embodiment hole spacing, the following devolatilization efficiency principles apply. 1. Devolatilization efficiency is about constant for strand angles in a range of from zero to 45 degrees. 2. Devolatilization efficiency decreases significantly for strand angles greater than 45 degrees, and in particular for strand angles greater than 60 degrees. In various embodiments, the nozzle 105 has a cross-section 110 such that the maximum strand angle in a range of from about zero to 45 degrees, as is described in more detail herein. In an embodiment, a majority of the perforations or holes in the flow tube, alternatively substantially all of the perforations or holes in the flow tube, have a maximum strand angle of equal to or less than 45 degrees. In various embodiments, equal to or greater than 50, 60, 70, 80, 90, 95, or 99 weight percent of the polymer strands exit the devolatilizer nozzle at a maximum strand angle of equal to or less than 45 degrees. This maximum of 45 degrees may vary depending on the strand spacing and nozzle hole diameter 115 used for a particular design.

The drillable length or area of the devolatilizer nozzle may have an effect on devolatilization of the polymer. Drillable length refers to the linear distance along the perimeter of a nozzle cross section where holes drilled in the nozzle result in a suitable strand angle for devolatilization as described herein. The drillable area of a given flow tube is the product of the drillable length multiplied by the unobstructed length of the flow tube. Of course, the length of the flow tubes as well as other physical dimensions of the nozzle may be limited by overall process design considerations, for example positioning and support of the nozzle within the vessel 130. The total drillable area for a devolatilizer nozzle is the sum of the drillable area for all the flow tubes of the nozzle.

Figure 3:
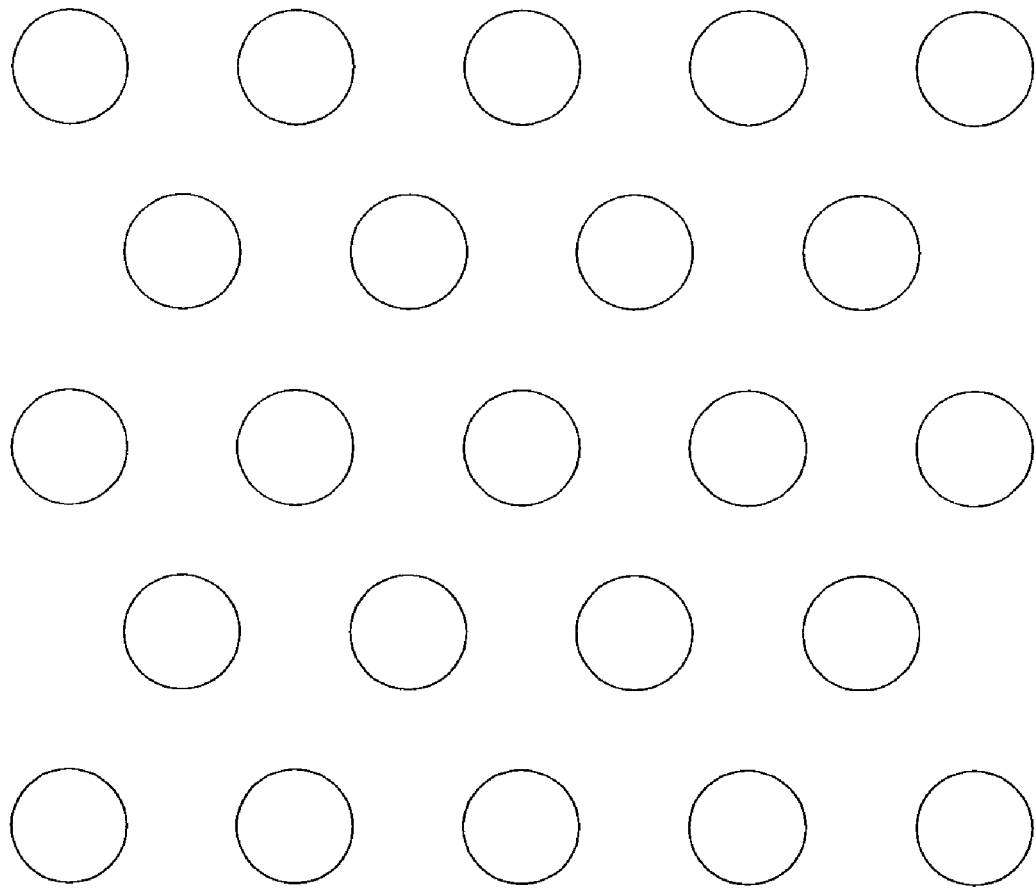
FIG. 3 is a schematic of a nozzle hole pattern.

The hole size, density, or both may have an effect on devolatilization efficiency. Hole density refers to the number of holes per unit area such as square inch. Hole size refers to the average diameter of the nozzle holes. In an embodiment, the hole diameter is from about $1/32$ inch to about $7/64$ inch, alternatively from about $2/64$ inch to about $7/64$ inch, alternatively from about $3/64$ inch to about $7/64$ inch. In an embodiment, the hole density is from about 10 to about 400 holes/in$^2$, alternatively from about 50 to about 55 holes/in$^2$, alternatively about 52 holes/in$^2$. Typically, the holes are about evenly spaced within the drillable area, for example in a 60 degree, triangular pitch pattern as shown in FIG. 3. In an embodiment, the center-to-center hole spacing is about $5/32$ inch. In an embodiment, hole size is chosen to be the smallest possible while avoiding fouling characteristics of the particular polymer or process fluid. The hole spacing may be chosen by balancing multiple factors, including nozzle strength requirements (where larger spacing may be desired), devolatization/hole density requirements (where smaller spacing may be desired), and the tendency for strands to clump when placed to close together. In FIG. 1, the hole density is such that the strength efficiency of the construction material, e.g., steel plate, is about equal to or greater than 0.7.

All or a portion of the nozzle holes may be constant diameter holes, tapered diameter holes, or combinations thereof. A constant diameter hole refers to holes having about the same diameter across the length of the hole, as is shown by parallel sidewalls 132 and 133 in FIG. 2, which are commonly produced for example by straight, constant diameter drill bits. A tapered diameter hole refers to holes having differing diameters on the inner and outer sides of the nozzle, wherein sidewalls 132 and 133 are not parallel across their entire lengths.

Figure 4:
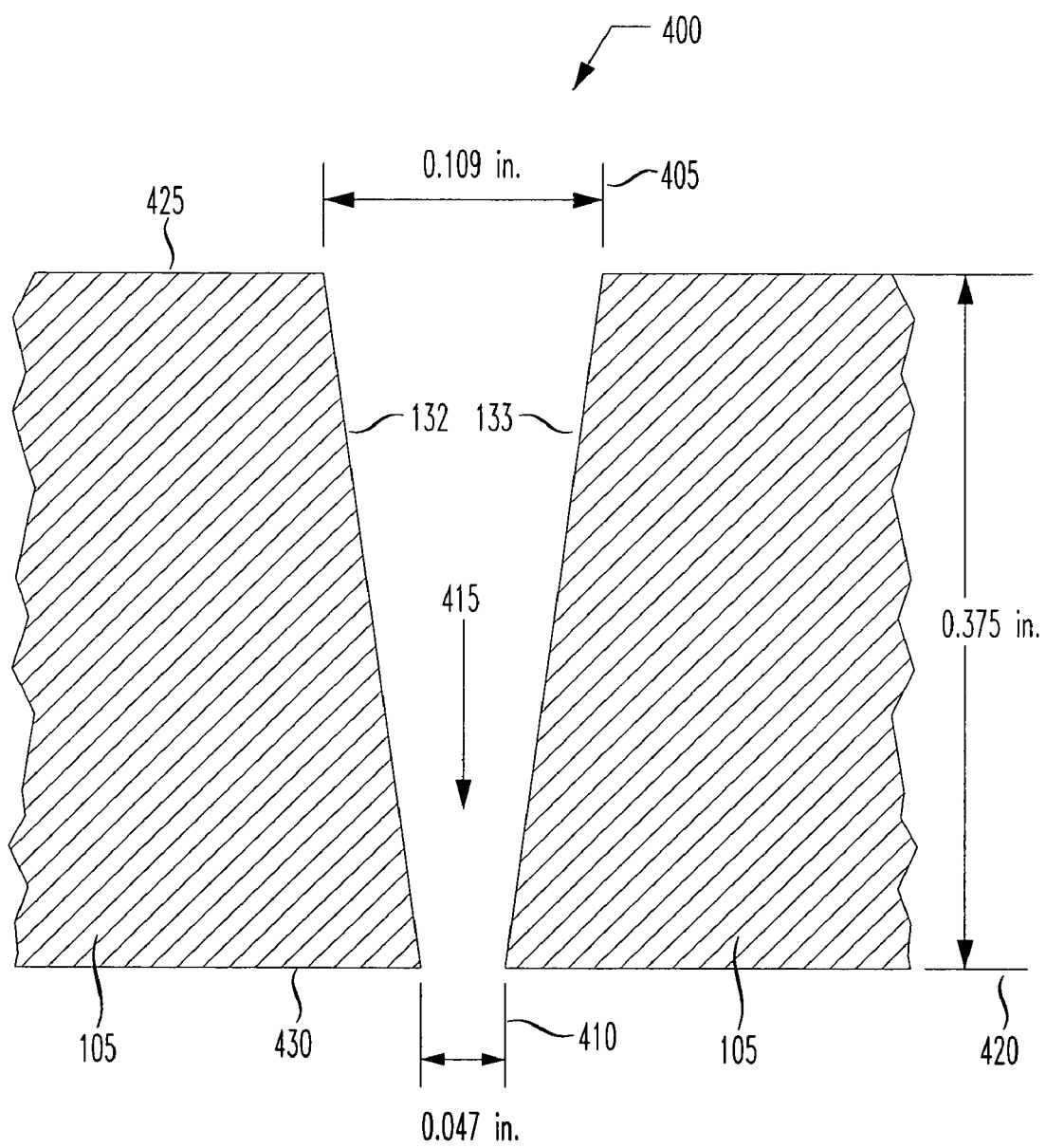
FIGS. 4 and 5 are magnified cross-sectional views of tapered nozzle holes.

FIG. 4 illustrates an embodiment of a tapered hole 400 having an inner diameter 405 on the inner nozzle wall 425 and an outer diameter 410 on the outer nozzle wall 430. Molten polymer flow from the inner diameter of the hole to the outer diameter of the hole to form a strand, as indicated by reference flow arrow 415. The length of the hole 420 is equal to the thickness of the wall of nozzle 105. In an embodiment, the inner diameter 405 may be smaller than the outer diameter 410. Alternatively, the inner diameter 405 may be larger than the outer diameter 410, as shown in FIG. 4. As further shown in FIG. 4, the taper may be a linear taper, which refers to an about constant rate of change, or slope, between the inner and outer diameters. In an embodiment, the nozzle comprises linear tapered holes having an inner diameter of about $7/64$ inch, the outer diameter of about $3/64$ inch, and a length of about 0.375 inch. Actual hole length and diameters may vary with nozzle pressure rating requirements, polymer flow, polymer properties, and devolatization goals.

Figure 5:
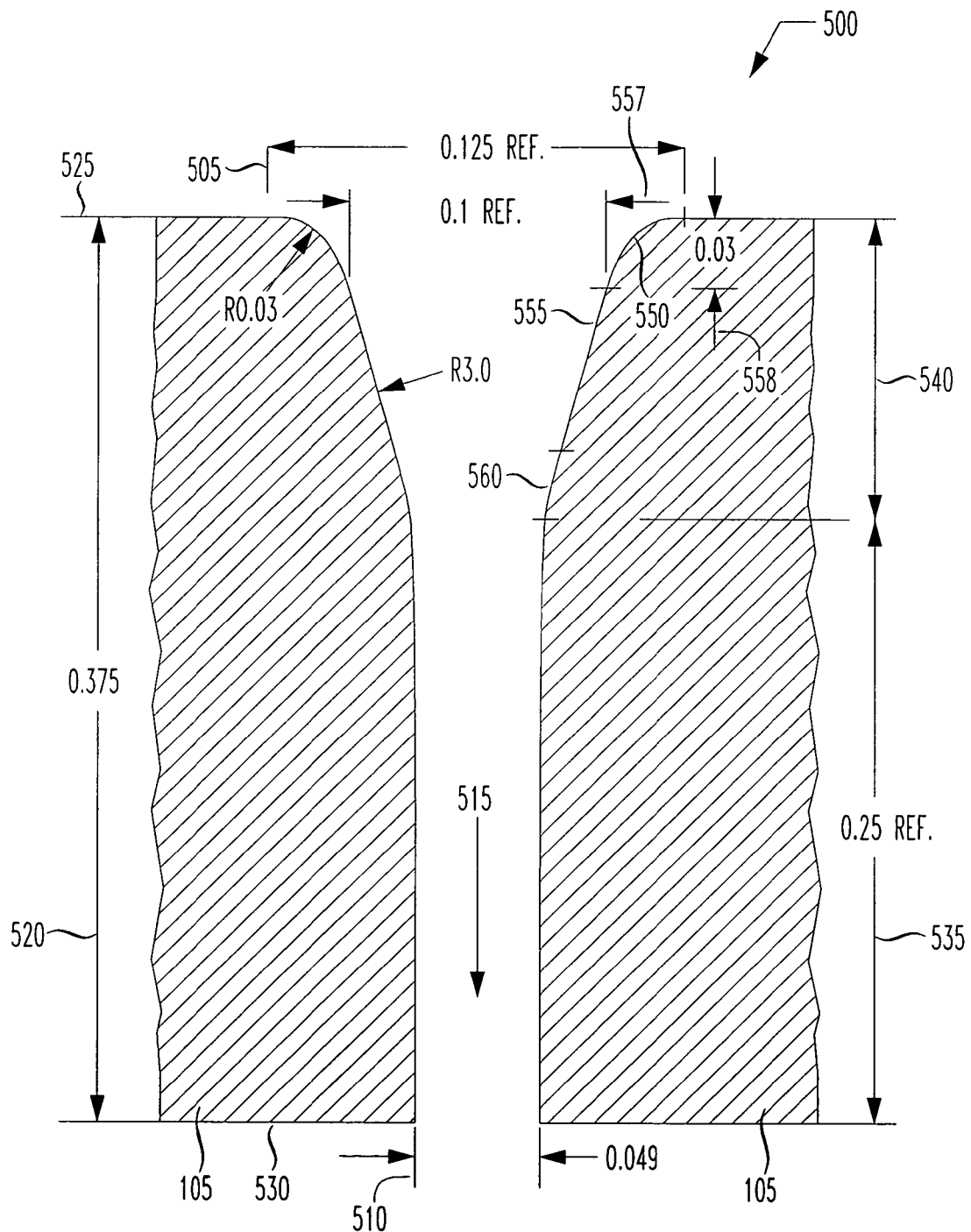

FIG. 5 illustrates an alternative embodiment of a tapered hole 500 having a an inner diameter 505 on the inner nozzle wall 525, an outer diameter 510 on the outer nozzle wall 530, and a length 520. Molten polymer flow from the inner diameter of the hole to the outer diameter of the hole to form a strand, as indicated by reference flow arrow 515. The tapered profile in FIG. 5 may be referred to as a funnel taper having an about constant diameter portion 535 and a non-constant diameter portion 540. The non-constant diameter portion 540 may further comprise a linear profile, a non-linear profile, or combinations thereof. The length of the constant diameter portion 535 may be about less than, equal to, or greater than the length of the non-constant diameter portion 540. In an embodiment, the length of the constant diameter portion 535 is greater than the length of the non-constant diameter portion 540, for example about twice the length of the non-constant diameter portion 540.

As shown in FIG. 5, the taper may funnel polymer from a larger inner diameter 505 to a smaller outer diameter 510. Alternatively, the taper may form an inverted funnel (or horn) to flow polymer from a smaller inner diameter 505 to a larger outer diameter 510. As shown in FIG. 5, the non-constant diameter portion 540 further comprises a shoulder portion 550 having a slightly curving diameter between the inner diameter 505 and a shoulder diameter 557 and a shoulder height 558. The non-constant diameter portion 540 further comprises a slightly curving throat portion 560 adjacent to and feeding into the about constant diameter portion 535. The non-constant diameter portion 540 further comprises an about linear portion 555 between the shoulder portion 550 and throat portion 560. In an embodiment, the nozzle comprises funnel tapered holes having an inner diameter of about 0.125 inch, a shoulder diameter of about 0.1 inch, a shoulder height of about 0.03, an outer diameter of about 0.049, an about constant diameter portion length of about 0.25 inch, and a non-constant diameter portion length of about 0.125. In FIG. 5, the entrance edges are not sharp or flat, but instead are a curvature of initial radius of 0.03 inches (R0.03), and second, internal taper of radius 3.0 inches (R3.0). Tapered or rounded edges and transition sections tend to reduce pressure drop.

In some embodiments, tapered holes may be employed in a devolatilizer nozzle in order to decrease the strength requirements of the nozzle structure. Such tapered holes decrease strength requirements by decreasing pressure drop from the inside to the outside of the nozzle. Incorporation of tapered holes may reduce heightened strength requirements that may arise as other enhancements intended to reduce volatile content are introduced. For example, use of tapered holes may alleviate the need for stronger materials that may complicate manufacturability and be more expensive. Likewise, tapered holes may help offset increased stress and strain associated with certain nozzle cross-sections, as described in more detail herein. In embodiments, tapered holes may reduce pressure drop across a devolatilizer nozzle by equal to or greater than about 50, 60, 70, 80, or 85 percent relative to an otherwise identical devolatilizer nozzle having constant diameter holes. In an embodiment, the stress concentration in the steel plate due to the tapered holes is about 2.41. Without intending to be limited by theory, it is further believed that the funnel taper provides a dual benefit in that (a) the larger inner diameter will provide for significant pressure drop reductions and (b) the about constant diameter portion may make the polymer strand less susceptible to swelling. Again, without intending to be limited by theory, the about constant diameter portion may make the polymer strand less susceptible to swelling by providing a physical mold as well as residence time for polymer chains to orient in the flow or strand direction.

Nozzle holes may be made by drilling or by water jet technology or by laser drilling or other machining methods. Constant diameter holes may be made with straight drill bits. For example, a linear tapered hole may be made with a tapered (e.g., conical) drill bit or by reaming with a straight bit. A funnel tapered hole may be made by a water jet or by drilling a straight hole followed by a tapered drill bit or reaming a portion of the hole. The holes may be made either before or after final fabrication. For example, holes may be formed by perforating metal sheets such as steel sheets, which may be subsequently cut, bent, welded, etc. to form the final nozzle assembly. Alternatively, the flow tubes can be drilled after fabrication.

The strength of the devolatilizer nozzle must be sufficient to withstand the stresses and strains associated with the pressure of forcing polymer through the nozzle holes. Factors contributing to a determination of suitable nozzle strength include hole diameter and density, nozzle wall thickness and shape, material of construction, and mass flow rate of polymer through the nozzle and associated pressures. The stress and strain for a given nozzle design may be analyzed using finite element analysis, for example by using commercially available modeling software such as ABAQUS software available from Abaqus, Inc. In an embodiment, finite element analysis may be carried out with ABAQUS Standard software using two and three-dimensional shells, assuming linear elastic material behavior, and using a modulus of elasticity for steel of $29 \times 10^6$ psi and Poisson's ratio for steel of 0.29. In general, lowering the material stress, and in particular point or concentrated stress such as at a bend or corner in a nozzle, lowers the overall strength requirements for the nozzle material and thereby allows less costly materials to be used. The effect of nozzle cross section on stress is disclosed in more detail herein.

The devolatilizer nozzles provided herein are formed from metal plates such as steel plates. The steel plates may be processed, shaped, and assembled according to parameters set forth herein by known metal working techniques such as cutting, stamping, milling, welding, and the like. The type of steel selected may be such that prior to tempering it is sufficiently ductile to minimize manufacturing difficulties during the steps of perforating the plate and forming it into the shape of a nozzle. If the steel plate is not sufficiently ductile or is overly hard, resulting manufacturing difficulties may raise costs. Harder steels are also more susceptible to brittle failures. A balance may be achieved between the need for greater strength and the need for manufacturability. In some embodiments, the steel plate is annealed to enhance ductility prior to perforating and forming the nozzle. Additional treatments suitable for modifying the structural characteristics of steel plates and devolatilizer nozzles are disclosed in U.S. Published Application 2005/0097748, which is incorporated herein by reference in its entirety.

In addition to possessing sufficient ductility, the type of steel may be such that tempering renders the finished devolatilizer nozzle capable of resisting the stresses and strains described herein. In embodiments, a devolatilizer nozzle, or a plate to be used to form a devolatilizer nozzle, may be subjected to a treatment, such as a heat treatment or annealing process, in order to achieve a suitable stress and/or strain tolerance. In certain embodiments the steel comprises stainless steel; alternatively, any AISI (American Iron and Steel Institute) 400 series stainless steel; alternatively, a treated AISI 400 series stainless steel; alternatively, heat treated 304 stainless steel; alternatively, 420 stainless steel; alternatively, 420F stainless steel; alternatively, 440A stainless steel; alternatively, AL-6XN stainless steel; or alternatively LDX 2101 stainless steel. In an embodiment, the nozzle is constructed of 0.375 in thick sheet steel.

The flow rate of polymer through the nozzle is impacted by, among other things, polymer characteristics such as viscosity, the drillable length and area of the nozzle, the nozzle hole density, and the nozzle pressure. The total flow rate of polymer through the nozzle may be expressed in lb/hr, which may be further divided by the total number of nozzle holes to get the flow rate per hole expressed in lb/hr/hole. In an embodiment, the devolatilizer nozzle may be operated at a polymer pressure equal to or less than about 800, 700, 600, 500, 400, 300, 200, 100, or 50 psig. The strands are typically exposed to a vapor space pressure equal to or less than about 30, 20, 10, 5, 1, or 0.2 torr to maximize devolatization efficiency.

Figure 6:
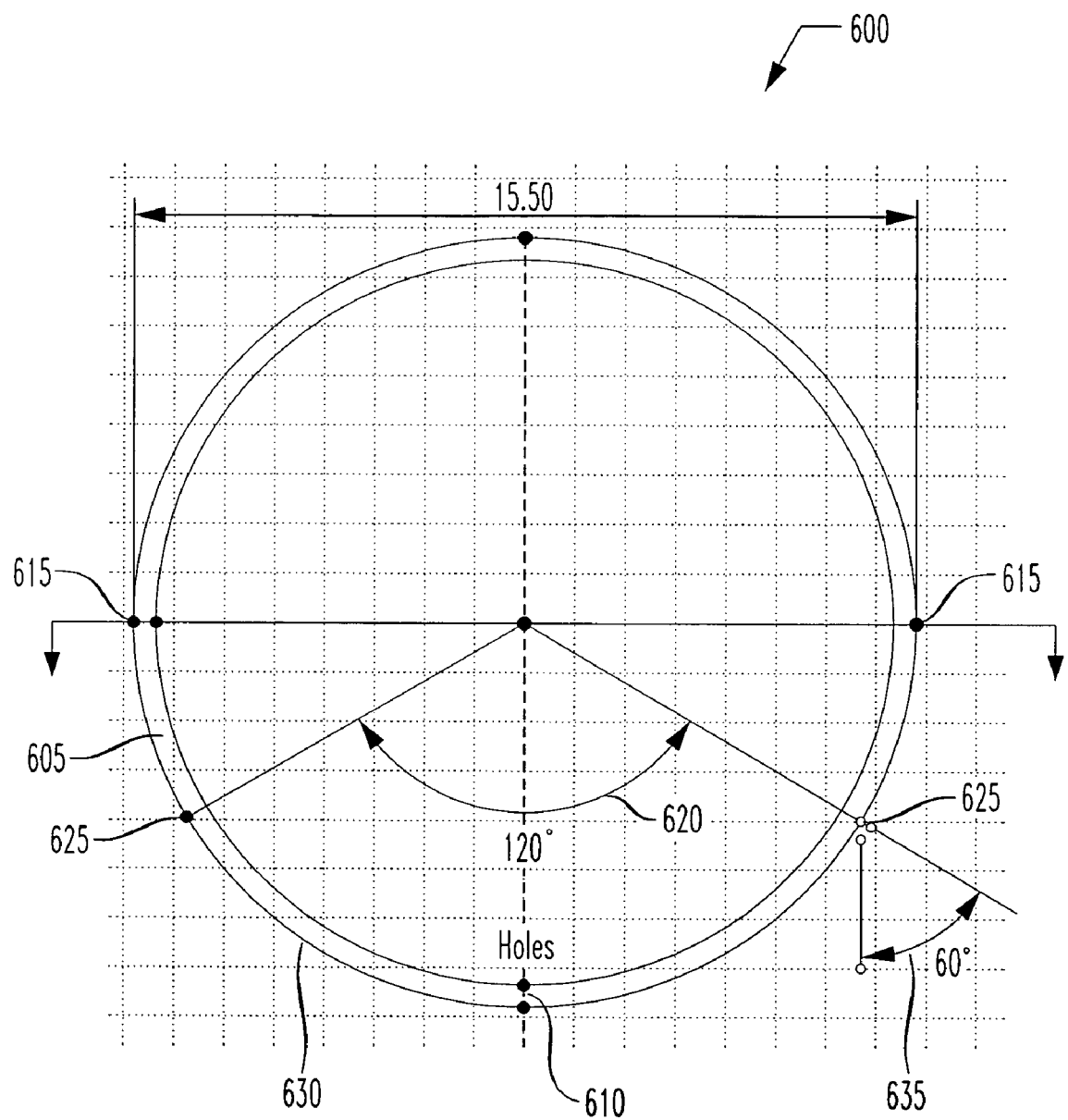
FIGS. 6-13 are cross-sectional views of devolatilizer nozzles.
Figure 7:
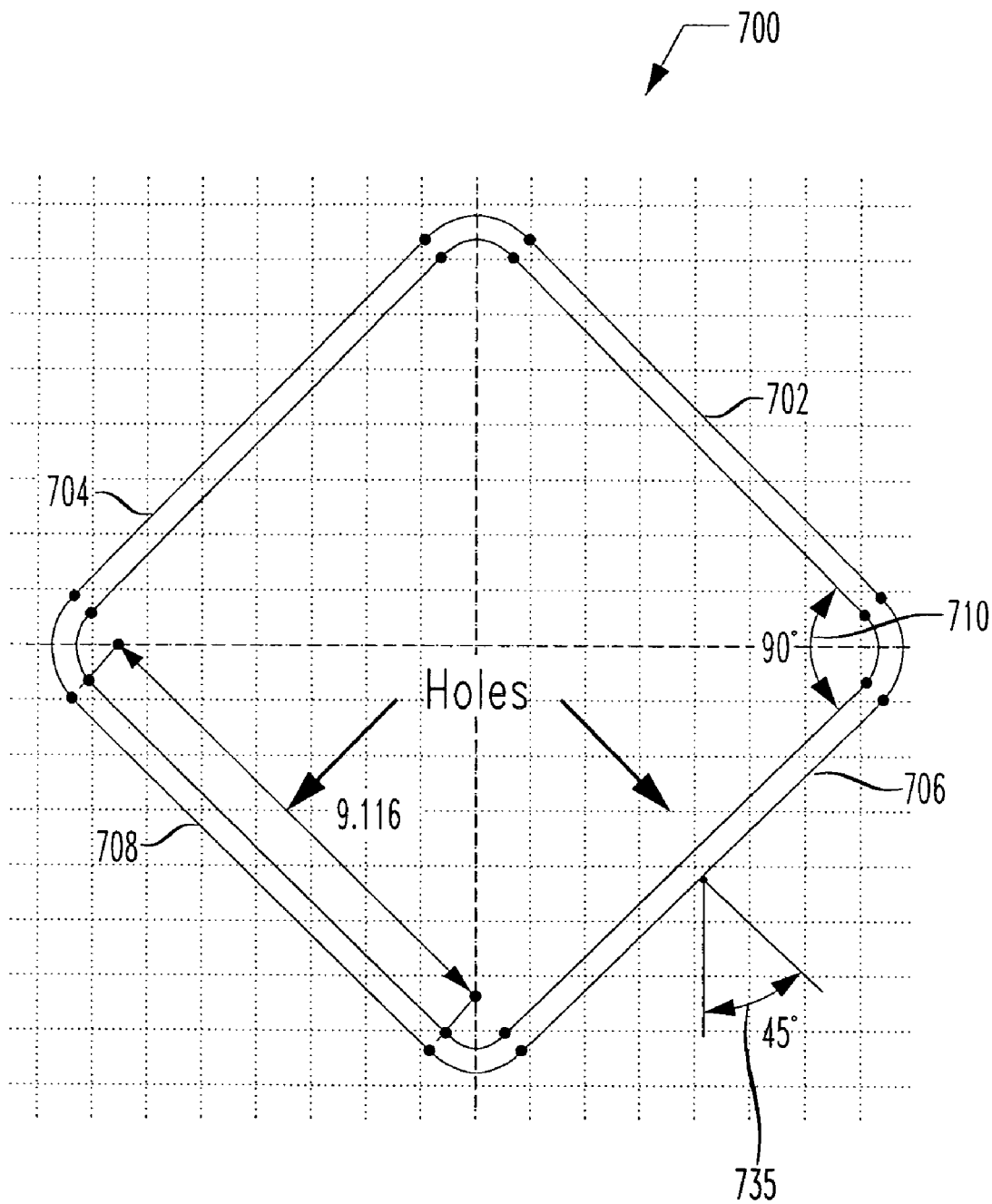
Figure 8:
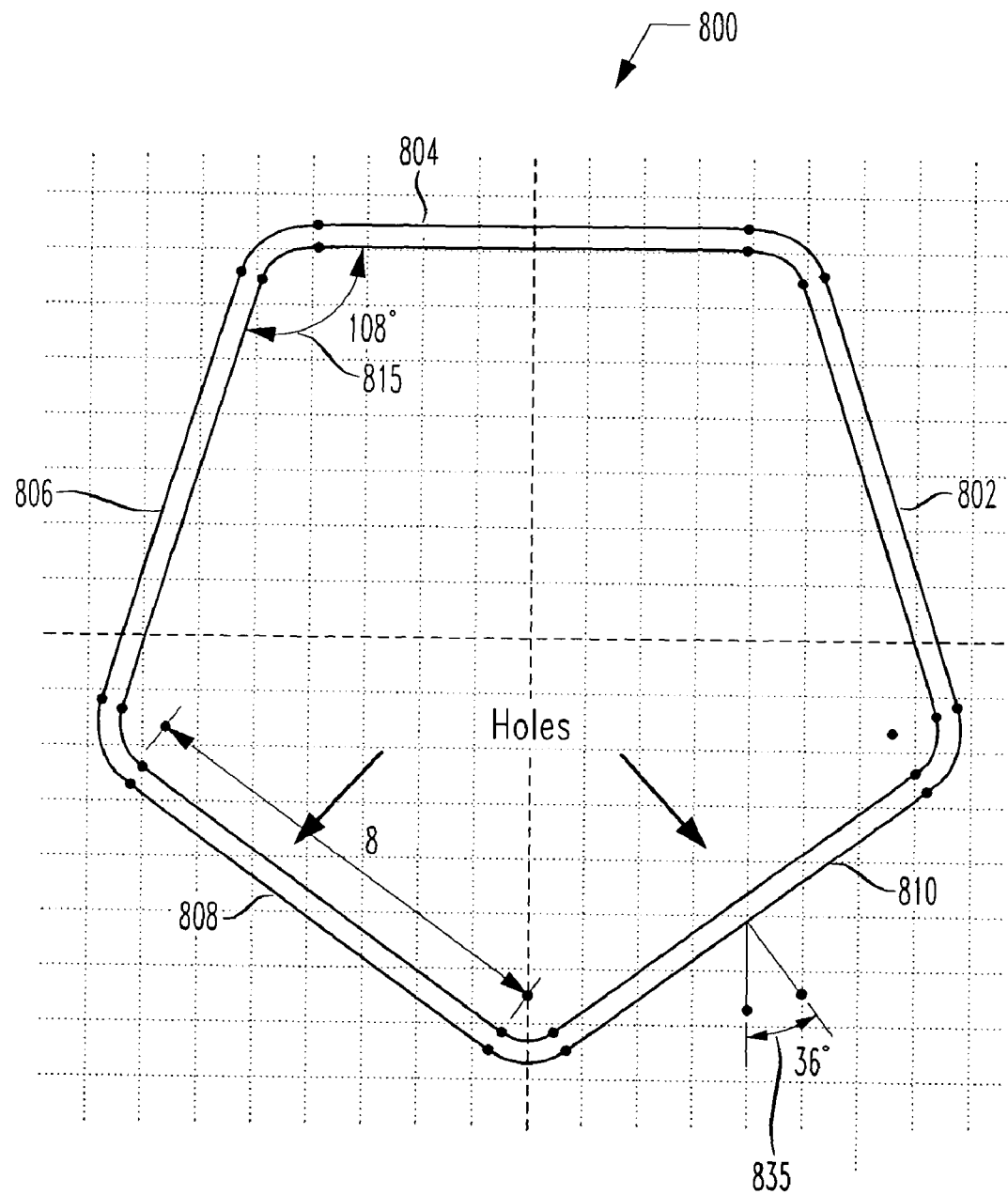
Figure 9:
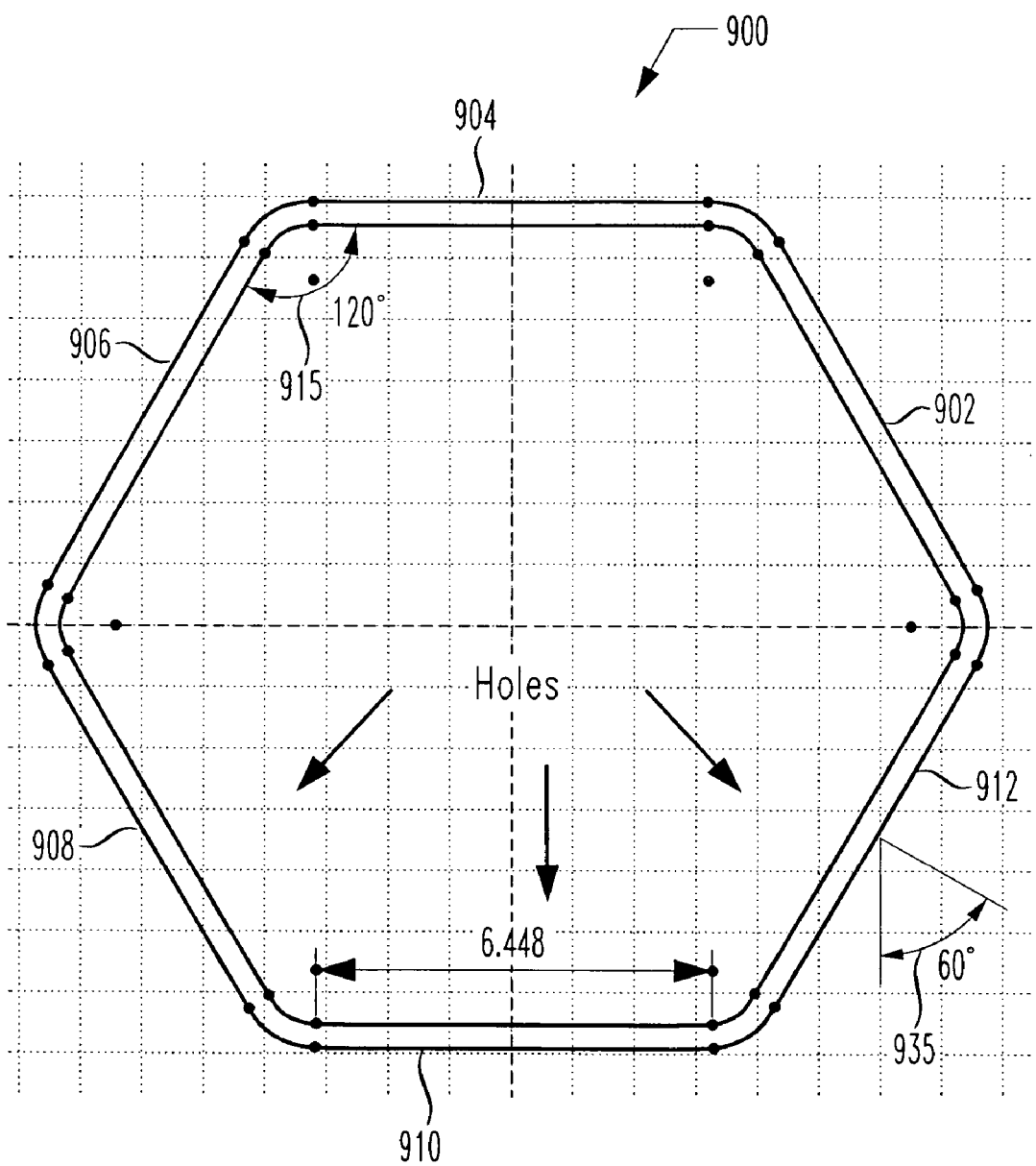
Figure 10:
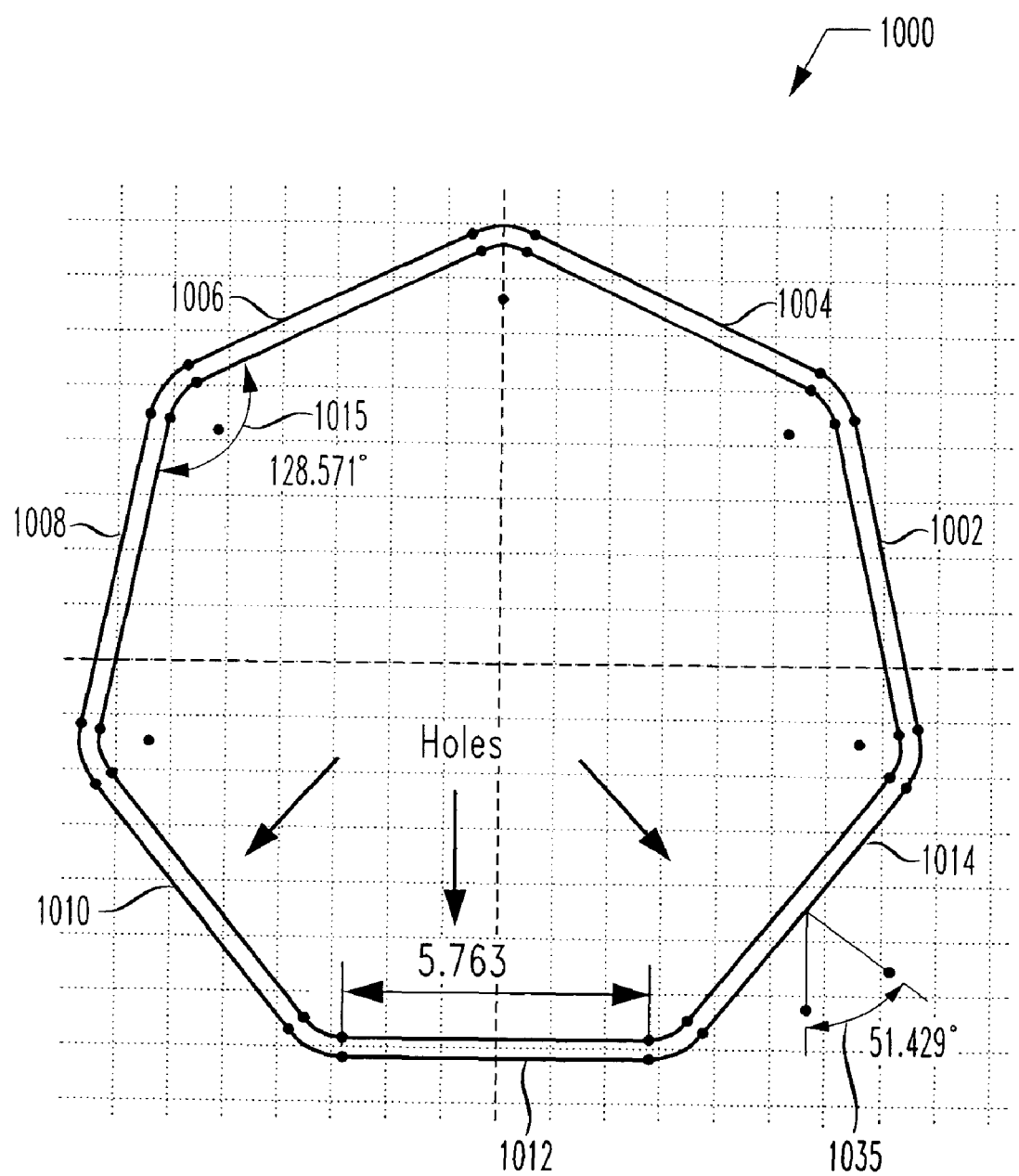
Figure 11:
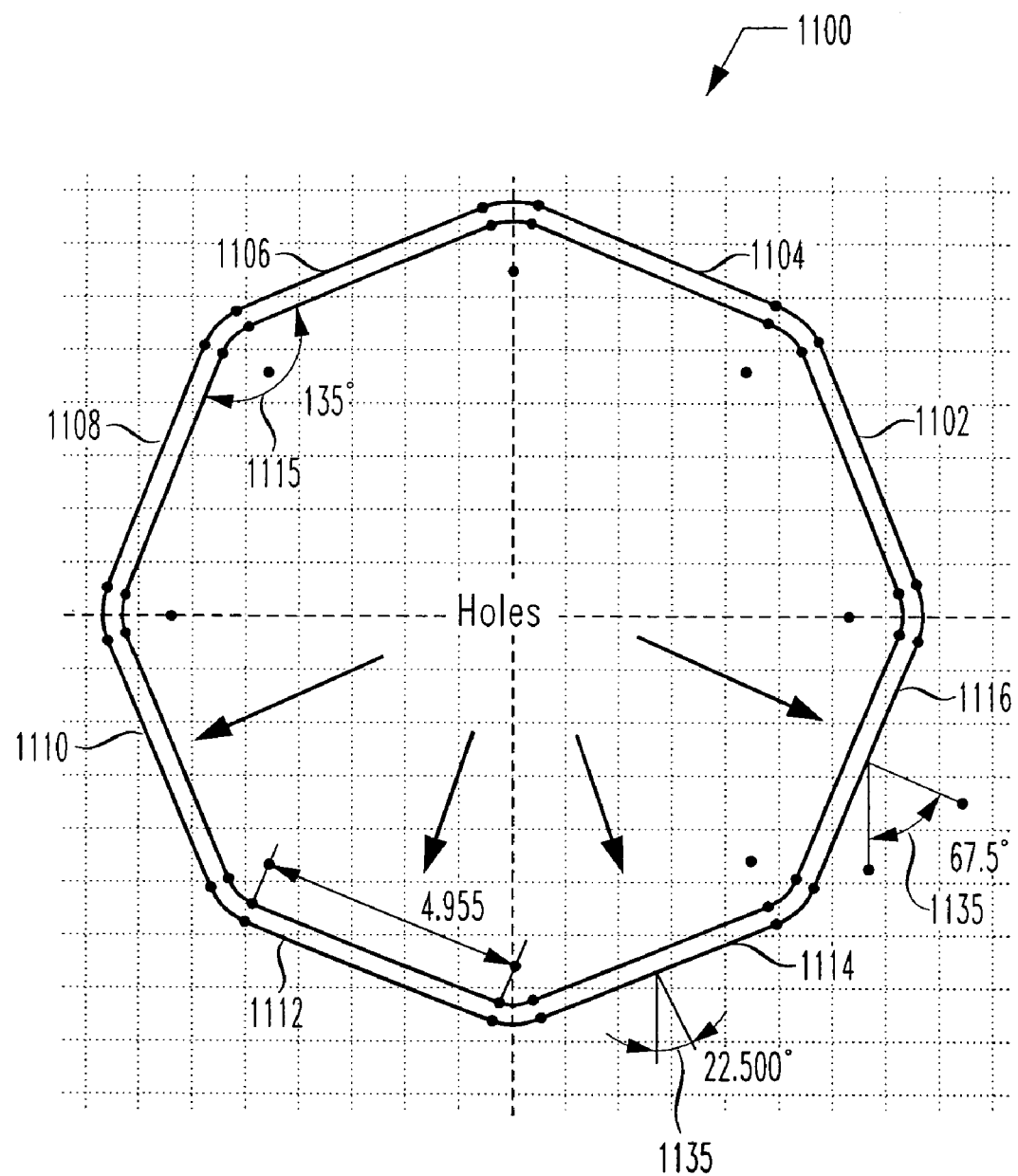

Referring to FIG. 1, nozzles 105 having a variety of cross-sectional shapes 110 may be employed. For example, one or more nozzles may have a circular cross-section as shown in FIG. 6, a diamond cross-section as shown in FIG. 7, a pentagonal cross-section as shown in FIG. 8, a hexagonal cross-section as shown in FIG. 9, a heptagonal cross-section as shown in FIG. 10, or an octagonal cross-section as shown in FIG. 11. The cross-sections may have equal length sides as shown in FIGS. 6-11, or may have unequal length sides as shown by the hexagonal cross-section of FIG. 12 and the octagonal cross-section of FIG. 13. In general, the drillable length of the various cross-sections is located on a lower portion of the cross-section such that polymer strands may extend downward from the nozzle 105 via gravity in the devolatilization vessel 130 without obstruction. In an embodiment, the cross-sections shown in FIG. 6-13 each have an about equal cross-sectional area of 754 in$^2$ (an equivalent diameter of 15.5 inches), with the understanding that any suitable cross-sectional area may be selected according to overall process and design considerations. For the same cross-sectional area, variations in nozzle cross-sectional shape may cause variations in, among other things, drillable area and number of perforations, strand angle, stress, strain, and volatile content in the devolatilized polymer, as discussed in more detail herein.

Referring to FIG. 6, the circular cross-section 600 has a lower half 605 that includes the drillable length of the cross-section. The strand angle varies along the lower half 605 from zero degrees at mid-point 610 to ninety degrees at each end point 615. Angle 620, which is 120 degrees, defines an arc 630 wherein the strand angle varies from zero degrees at mid-point 610 to sixty degrees at arc end points 625. In an embodiment, the circular cross-section has a diameter of 15.5 inches. At 120 degrees, arc 630 corresponds to a drillable length of 15.84 inches and a maximum strand angle 635 of sixty degrees. At an angle 620 of 90 degrees, arc 630 corresponds to a drillable length of 11.88 and a maximum strand angle of forty-five degrees.

Referring to FIG. 7, the diamond cross-section 700 has four equal length sides 702, 704, 706, and 708 and each side angle 710 is a right (90 degree) angle. Sides 706 and 708 include the drillable length of cross-section 700. The drillable length is the length along each of sides 706 and 708 wherein the strand angle 735 is a constant 45 degrees. The drillable length is less than the length of sides 706 and 708 because each side begins to curve as it approaches a corner, which decreases or increases the strand angle from a constant of 45 degrees. In an embodiment, each side 706 and 708 has a drillable length of about 9.116 inches, for a total drillable length of about 18.23 inches.

Referring to FIG. 8, the pentagonal cross-section 800 has five equal length sides 802, 804, 806, 808, and 810 and each side angle 815 is 108 degrees. Sides 808 and 810 include the drillable length of cross-section 800. The drillable length is the length along each of sides 808 and 810 wherein the strand angle 835 is a constant 36 degrees. In an embodiment, each side 808 and 810 has a drillable length of about 8 inches, for a total drillable length of about 16 inches.

Referring to FIG. 9, the hexagonal cross-section 900 has six equal length sides 902, 904, 906, 908, 910, and 912 and each side angle 915 is 120 degrees. Sides 908, 910, and 912 include the drillable length of cross-section 900. The drillable length is the length along each of sides 908 and 912 wherein the strand angle 935 is a constant 60 degrees and the length along side 910 wherein the strand angle is a constant 0 degrees. In an embodiment, each side 908, 910, and 912 has a drillable length of about 6.448 inches, for a total drillable length of about 19.344 inches.

Referring to FIG. 10, the heptagonal cross-section 1000 has seven equal length sides 1002, 1004, 1006, 1008, 1010, 1012, and 1014 and each side angle 1015 is 128.571 degrees. Sides 1010, 1012, and 1014 include the drillable length of cross-section 1000. The drillable length is the length along each of sides 1010 and 1014 wherein the strand angle 1035 is a constant 51.429 degrees and the length along side 1012 wherein the strand angle is constant 0 degrees. In an embodiment, each side 1010, 1012, and 1014 has a drillable length of about 5.763 inches, for a total drillable length of about 17.289 inches.

Referring to FIG. 11, the octagonal cross-section 1100 has eight equal length sides 1102, 1104, 1106, 1108, 1110, 1112, 1114, and 1116 and each side angle 1115 is 135 degrees. Sides 1110, 1112, 1114, and 1116 include the drillable length of cross-section 1100. The drillable length is the length along each of sides 1110 and 1116 wherein the strand angle 1135 is a constant 67.5 degrees and the length along sides 1112 and 1114 wherein the strand angle is a constant 22.5 degrees. In an embodiment, each side 1110, 1112, 1114, and 1116 has a drillable length of about 4.955 inches, for a total drillable length of about 19.82 inches.

Figure 12:
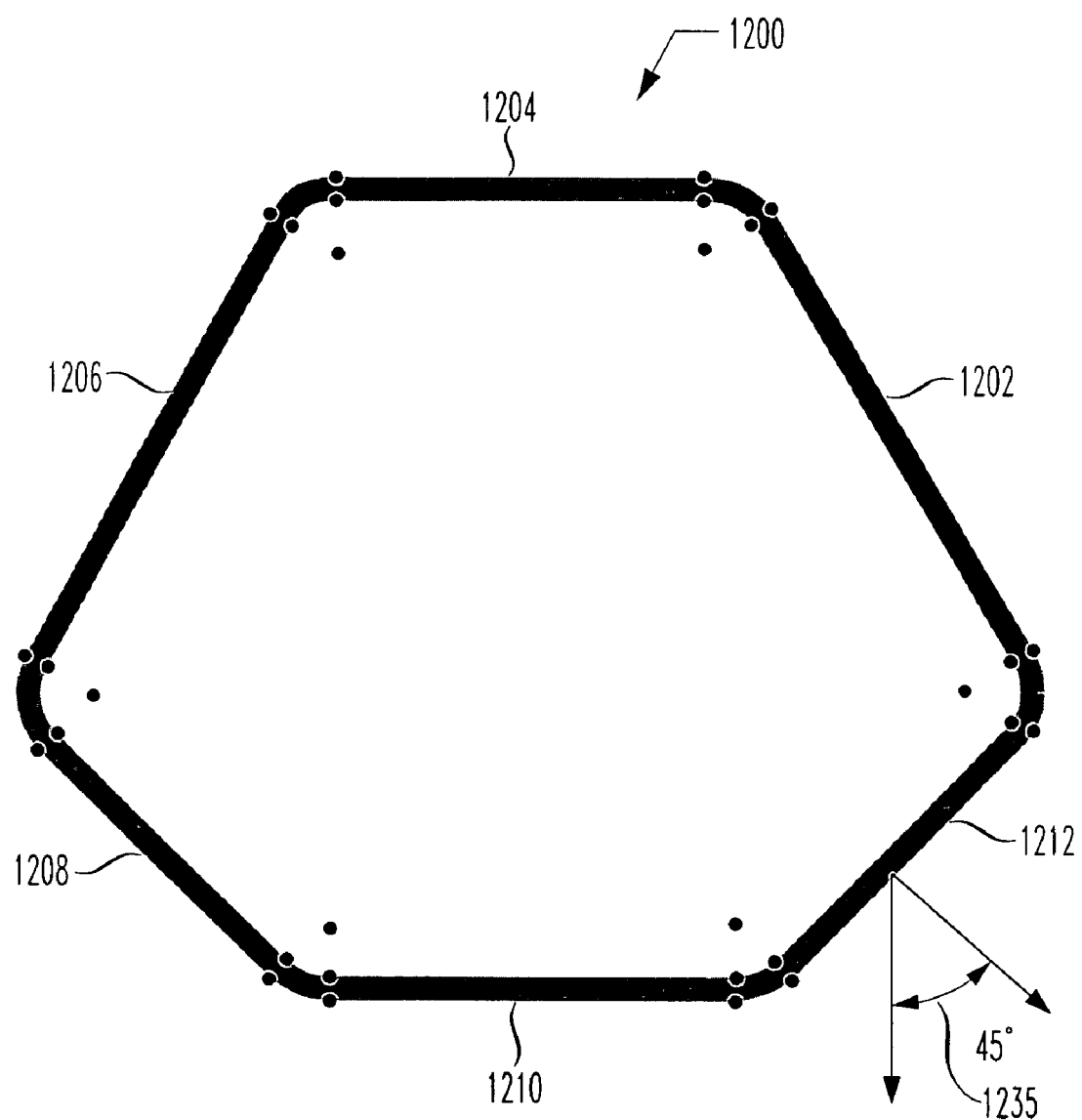

Referring to FIG. 12, the irregular hexagonal cross-section 1200 has unequal length sides 1202, 1204, 1206, 1208, 1210, and 1212. The angles between the sides are 105 and 135 degrees. Sides 1208, 1210, and 1212 include the drillable length of cross-section 1200. The drillable length is the length along each of sides 1208 and 1212 wherein the strand angle 1235 is a constant 45 degrees and the length along side 1210 wherein the strand angle is zero degrees. In an embodiment, each side 1208 and 1212 has a drillable length of about 5.5 inches and side 1210 has a drillable length of about 6.89 inches, for a total drillable length of about 17.89 inches.

Figure 13:
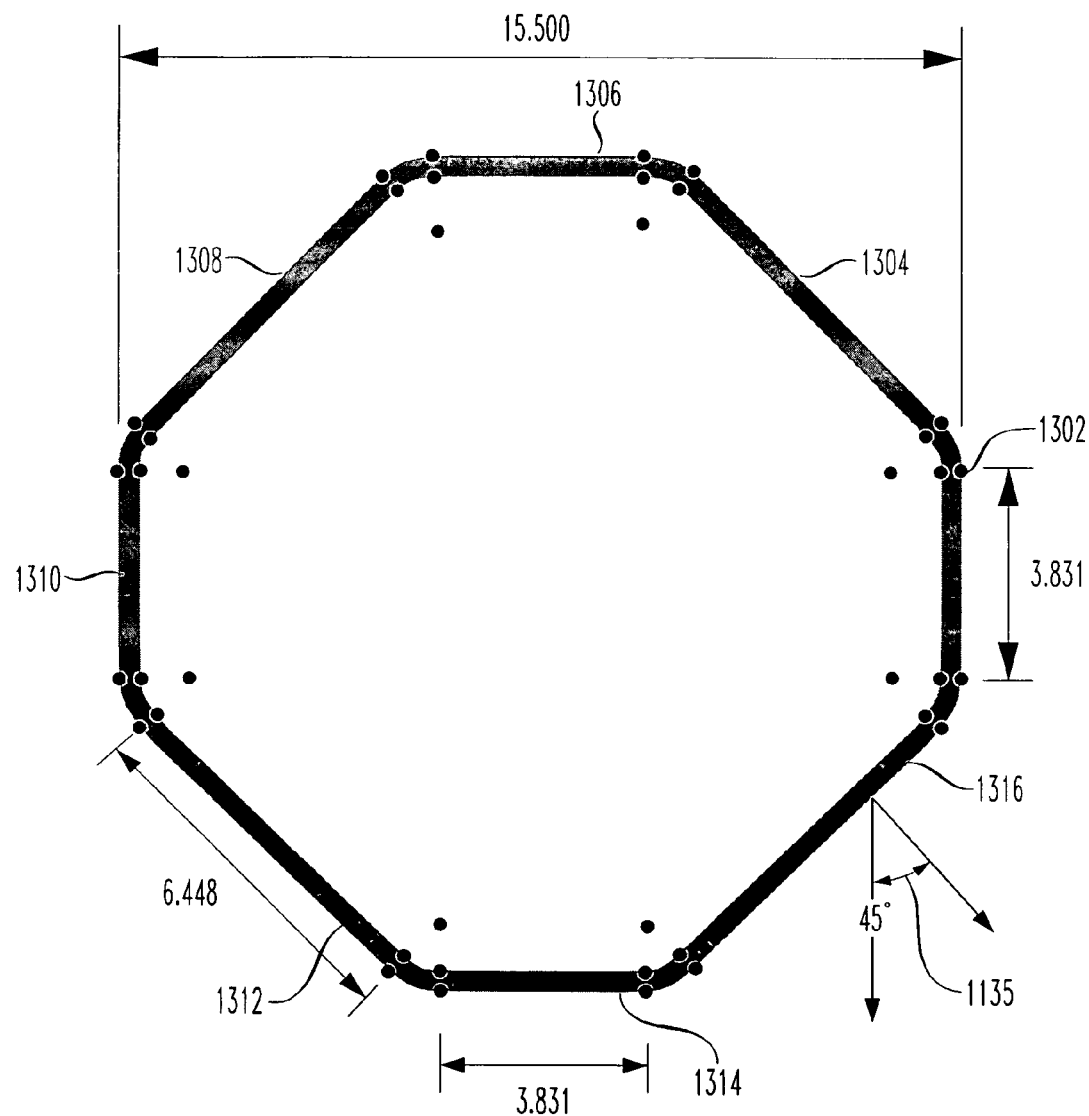

Referring to FIG. 13, the octagonal cross-section 1300 having a first set of sides 1304, 1308, 1312, and 1316 and a second set of sides 1302, 1306, 1310, and 1314, wherein the lengths of the first set of sides does not each the lengths of the second set of sides and each side angle 1315 is 135 degrees. In an embodiment, the lengths of the first set of sides are greater than the lengths of the second set of sides. In and embodiment, the lengths of the first set of sides are about twice the lengths of the second set of sides. Sides 1312, 1314, and 1316 include the drillable length of cross-section 1300. The drillable length is the length along each of sides 1312 and 1316 wherein the strand angle 1135 is a constant 45 degrees and the length along side 1314 wherein the strand angle is zero. In an embodiment, each side 1312 and 1316 has a drillable length of about 6.448 inches and side 1314 has a drillable length of about 3.831 inches, for a total drillable length of about 16.727 inches.

Table 1 shows the number of perforated sides ($N_S$), the drillable length ($L_D$), and the maximum strand angle ($\theta$) for each of the nozzle cross-sections in FIGS. 6-13. Pressures listed in Table 1 are for a devolatilizer vessel upstream from the flow tubes. The example data of Table 1 are associated with a constant cross-sectional area of about 754 in$^2$ for the cross-sections of FIGS. 6-13. Cross-sectional area is important in designing for pressure drops and uniform flow distribution. Cross-sectional shapes may be compared on a constant width-to-drillable-area basis to optimize the flow tube sizing and to maximize the total hole number for a given vessel size. As is shown in Table 1, each of the polygonal cross-sections of FIGS. 7-13 has more drillable length than the circular cross-section in FIG. 6. As noted previously, an increase in drillable length generally corresponds to an increase in the numbers of holes, which may likewise improve devolatilization efficiency. As shown in Table 1, the maximum strand angle for FIGS. 7, 8, 12, and 13 are each equal to or less than 45 degrees. As discussed previously, devolatilization efficiency decreases significantly for strand angles greater than 45 degrees. Considering both maximum strand angle and drillable length, the diamond cross-section of FIG. 7 provides the highest drillable length of 18.23 inches while having a maximum strand angle that is equal to the upper limit of 45 degrees.

and strain, and the four-sided cross-section of FIG. 7 displays the highest stress and strain. Finite element analysis was performed using ABAQUS CAE and Standard software for nozzles of FIGS. 7-11 constructed of AL-6XN stainless steel at 500 F, and the results are listed in Table 1, which confirmed that as the number of line segments increases, the stress and strain are decreased. Again, as the number of straight segments increase, their length decreases, thereby reducing the bending stresses on the segments.

The following equations were used to predict styrene monomer levels in polystyrene devolatilized with nozzles having non-circular cross-sections for a polymer flow rate of from about 0.003 to about 1 lb/hr/hole, alternatively from about 0.3 to 1 lb/hr/hole, alternatively about 0.049 lb/hr/hole, at 469° F.:

$$V_{\theta=0}=0.5883\rho^{1.3935} \quad (1)$$

$$V_\theta=0.0086\rho^2-0.5664\rho+0.0719\rho\theta-0.1578\theta-8.3127 \quad (2)$$

$$V=\alpha_0 V_0+\alpha_\theta V_\theta \quad (3)$$

where V is the styrene volatile levels in ppm, p is the operating pressure of the nozzle in torr (which may also be the exit pressure from an upstream flash devolatilizer), $\alpha_0$ is the fraction of holes with a strand angle $\theta$ equal to zero degrees, and $\alpha_\theta$ is the fraction of holes with a strand angle greater than zero and less than or equal to 45 degrees. The results for the predictions for the cross-sections of FIGS. 7, 9, and 13 are

TABLE 1

| | | | | | Volatiles (ppm) | | | |
|---|---|---|---|---|---|---|---|---|
| Cross-Section | $N_s$ | $L_D$ (in) | $\Theta_{max}$ (degrees) | Stress (psi) | Strain (%) | 20 torr | 25 torr | 30 torr | 40 torr |
| Circular (FIG. 6) | 1 | 15.84 | 60 | n/a | n/a | | | | |
| Diamond (FIG. 7) | 2 | 18.23 | 45 | 62,192 | 7.6 | 41 | 57 | 72 | 105 |
| Pentagonal (FIG. 8) | 2 | 16.0 | 36 | 57,742 | 5.9 | | | | |
| Hexagonal (FIG. 9) | 3 | 19.34 | 60 | 44,307 | 2 | 53 | 72 | 91 | 131 |
| Heptagonal (FIG. 10) | 3 | 17.29 | 51.43 | 41,661 | 0.6 | | | | |
| Octagonal (FIG. 11) | 4 | 19.82 | 67.5 | 39,368 | 0.3 | | | | |
| Irregular Hexagonal (FIG. 12) | 3 | 17.89 | 45 | n/a | n/a | | | | |
| Irregular Octagonal (FIG. 13) | 3 | 16.73 | 45 | n/a | 0.8 | 41 | 56 | 71 | 104 |

Each shape described has corners or bends. To minimize stress and strain, the corners may be fabricated with a bend radius. Larger bend radi provide lower stresses, but also lead to a loss of drillable area. The ideal bend radi depends on pressure rating requirements, steel thickness, type of steel or material of construction, and fabrication methods. The bend radi may be less than or equal to 4, 3, 2, 1.5, 1, 0.75, or 0.5 inches.

Figure 14:
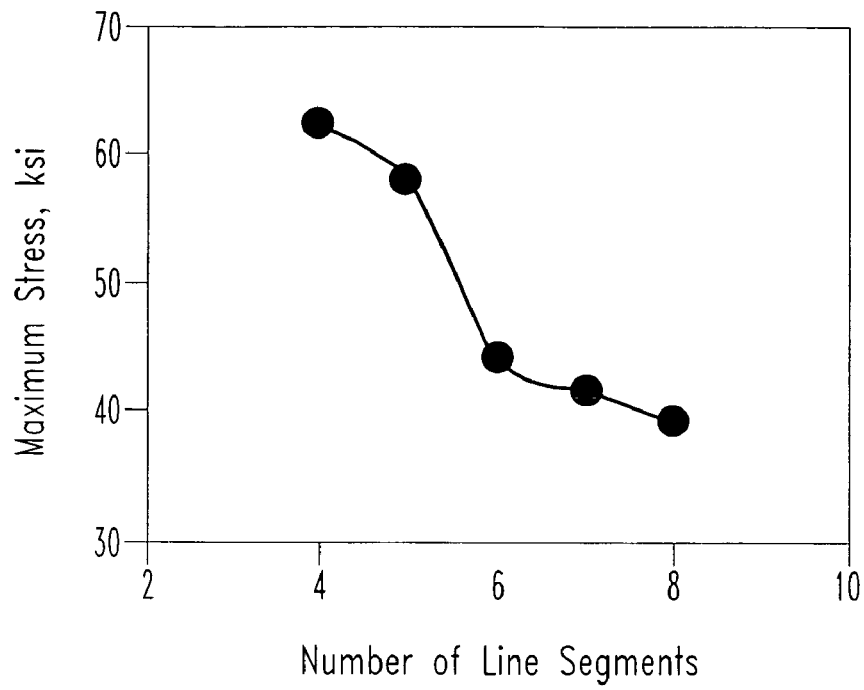
FIG. 14 is a graph of maximum stress per number of nozzle line segments.
Figure 15:
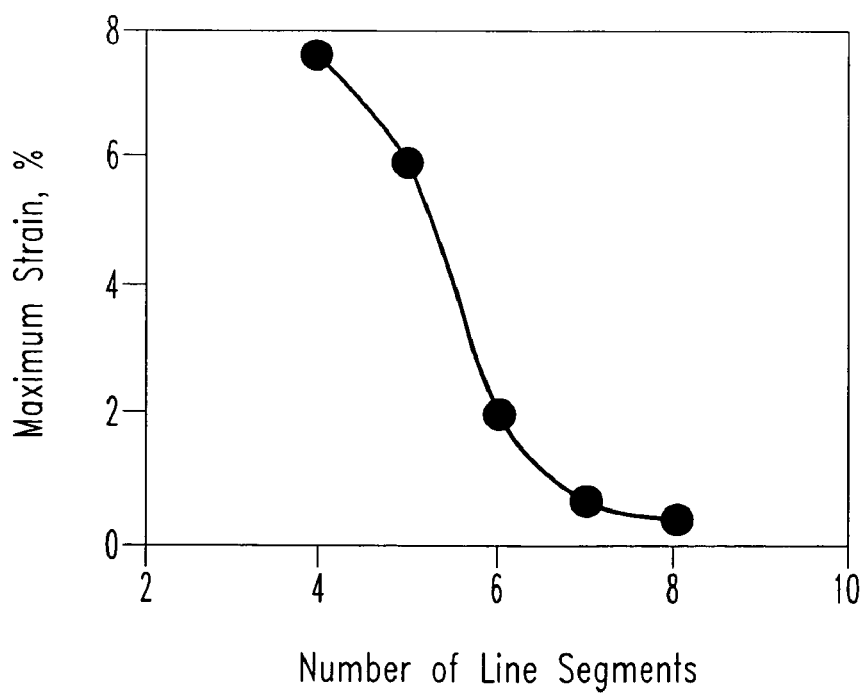
FIG. 15 is a graph of maximum strain per number of nozzle line segments.

Variations in the cross-sectional shape of the nozzle also influence the structural stress and strain on the nozzle. FIG. 14 is a graph of the maximum stress per number of line segment and FIG. 15 is a graph of the maximum strain per number of line segments of the various polygonal cross-sections in FIGS. 7-13. The number of line segments in FIGS. 14 and 15 corresponds to the number of sides in the nozzle cross-section. As shown by FIGS. 14-15, stress and strain decrease as the number of sides in the cross-section increase. A circular cross-section as shown in FIG. 6 generally displays lower stress and strain than any of the polygonal cross-sections of FIGS. 7-13. The eight-sided cross-sections of FIGS. 11 and 13 more closely approximate a circular cross-section than the four-sided cross-section of FIG. 7. Thus, the eight-sided cross-sections of FIGS. 11 and 13 display the lowest stress listed in Table 1. As shown in the table, all three cross-sections are capable of producing polystyrene having less than 100 ppm at an operating pressure of equal to or less than 30 torr.

Considering maximum strand angle, drillable length, and maximum stress and strain, the diamond cross-section of FIG. 7 provides the highest drillable length of 18.23 inches while having a maximum strand angle that is equal to the upper limit of 45 degrees, but also provides the highest stress and strain. In an embodiment, a nozzle having the diamond cross-section of FIG. 7 further comprises tapered holes to further reduce stress and/or strain on the nozzle, and such a nozzle may be made for example from 304 stainless steel, alternatively AL-6XN stainless steel, alternatively LDX 2101 stainless steel. In an embodiment, a nozzle having a cross-section of FIG. 7 may provide a devolatilized polymer (e.g., polystyrene) having equal to or less than about 100 ppm, or alternatively equal to or less than about 50 ppm, volatiles (e.g., styrene monomer).

Considering maximum strand angle, drillable length, and maximum stress and strain, the octagonal cross-section of FIG. 13 provides a drillable length of 16.73 inches while having a maximum strand angle that is equal to the upper limit of 45 degrees and also providing the lowest stress and strain.

In an embodiment, a nozzle having the octagonal cross-section of FIG. 13 further comprises tapered holes to further reduce stress and/or strain on the nozzle. As a result, a nozzle having a cross-section of FIG. 13 may be made of a less expensive material than a nozzle having a diamond cross-section of FIG. 7. Furthermore, the reduction in drillable length in comparison to FIG. 7 may lower overall manufacturing costs as perforating the steel plate is typically a substantial portion of such costs. In an embodiment, a nozzle having a cross-section of FIG. 13 is made of 304 stainless steel, alternatively AL-6XN stainless steel. In an embodiment, a nozzle having a cross-section of FIG. 13 may provide a devolatilized polymer (e.g., polystyrene) having equal to or less than about 100 ppm, or alternatively equal to or less than about 50 ppm, volatiles (e.g., styrene monomer).

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of devolatilizing a polymer, comprising:
    passing a molten polymer through a devolatilizer nozzle comprising:
        at least one perforated flow tube comprising a non-circular cross-section to produce a plurality of polymer strands, wherein a majority of the strands exit the devolatilizer nozzle at a maximum strand angle of equal to or less than 45 degrees; and
        tapered holes; and
    recovering a devolatilized polymer from the devolatilizer nozzle, wherein the devolatilized polymer is polystyrene comprising equal to or less than about 1000 ppm of styrene monomer.

2. The method of claim 1, wherein the non-circular cross-section has equal to or greater than 3 sides.

3. The method of claim 1, wherein the non-circular cross-section is a triangle, diamond, pentagon, hexagon, heptagon, or octagon.

4. The method of claim 1, wherein the cross-section is a diamond or an octagon.

5. The method claim 1, wherein the tapered holes are formed by a water jet.

6. The method of claim 1, further comprising a plurality of parallel flow tubes.

7. The method of claim 1, further comprising 304 stainless steel, AL-6XN stainless steel, or LDX 2101 stainless steel.

8. The method of claim 1, wherein all or a portion of the tapered holes have a linear taper.

9. The method of claim 1, wherein all or a portion of the tapered holes have a funnel taper.

10. The method of claim 1, wherein the tapered holes reduce the pressure drop across the nozzle equal to or greater than about 50 percent as compared to non-tapered holes.

* * * * *